Patented Oct. 27, 1953

2,657,200

UNITED STATES PATENT OFFICE 2,657,200

COPOLYMERS OF ACETYLENE WITH CERTAIN VINYLIDENE COMPOUNDS

Frank Clifton McGrew, Wilmington, Del., and Paul Swithin Pinkney, Niagara Falls, N. Y., assignors to E. I. du Pont de Nemours & Company, Wilmington, Del., a corporation of Delaware No Drawing. Application October 3, 1950, Serial No. 188,272

13 Claims. (Cl. 260—85.5)

This invention relates to new compositions of matter. More particularly it relates to new organic polymeric materials and to a method for preparing them.

Copolymers of two or more copolymerizable ethylenically unsaturated compounds such as ethylene with acrylyl and alkacrylyl compounds, etc., are well known and they have been found useful in many applications. Likewise, copolymers of olefinic hydrocarbons such as ethylene and isobutylene with acetylene are known and products of this type have certain advantages. However, the hitherto known methods of polymerization have not been found effective in preparing copolymers of acetylene with acrylyl and alkacrylyl compounds and other vinylidene compounds where the vinylidene group is attached to multiply bonded carbon.

This invention has as an object the preparation of copolymers of acetylene. Other objects will appear hereinafter.

These objects are accomplished by the invention of copolymers of acetylene with a polymerizable vinylidene compound having the vinylidene, $CH_2=C<$, group attached by a single bond to a carbon atom which is in turn attached, by a multiple bond, to another atom, the copolymers containing from 5 to 50 mole per cent of combined acetylene, and their preparation by subjecting a mixture of acetylene and the vinylidene compound containing at least 15 mole per cent and preferably not more than 75 mole per cent of acetylene under superatmospheric pressure to a temperature of from $-20°$ C. to $250°$ C. in the presence of a free radical type vinyl polymerization initiator.

The products of this invention are unsaturated copolymers which are solids or viscous oils and which are soluble in organic solvents such as, for example, chloroform, acetone, methanol, phenol, benzene, dimethylformamide, and the like.

In one method for carrying out the process of this invention there are placed in a reaction vessel capable of withstanding high pressures a vinylidene compound as above defined, e. g., methyl methacrylate, a small amount, e. g., 0.015% to 5% of the weight of the comonomers, of an addition polymerization catalyst such as a free radical-liberating peroxide or azo compound, and, if desired, a reaction medium such as tertiary-butyl alcohol or water. The air in the reaction vessel is then replaced with an inert gas such as nitrogen, the vessel is closed and cooled in a solid carbon dioxide-acetone bath, and a quantity of acetylene amounting to at least 15 mole per cent of the total monomers is introduced into the reaction vessel. The closed reaction vessel is then heated to a temperature of from $40°$ to $150°$ C., with agitation, for from 2 to 30 hours under superatmospheric pressure, preferably at a pressure of 100–1000 atmospheres. The exact time of reaction depends on the particular catalyst and the particular reaction temperature employed, the longer times being required at temperatures where the catalyst employed generates free radicals very slowly. At the completion of the polymerization the reaction mixture is removed from the reactor, steamed to remove volatile materials and the residual polymer is dried.

In another method of carrying out the process of this invention, a mixture of the vinylidene compound, reaction medium, and catalyst is heated to about $75°$ C. in a reaction vessel capable of withstanding a high pressure, and an excess of acetylene is circulated at a pressure of 300–500 lbs./sq. in. through the heated reaction mixture for several hours. At the end of the polymerization the excess acetylene is vented and the reaction mixture is worked up as described above.

An especially preferred method for preparing the acetylene/vinylidene compound copolymers of this invention involves placing in a reaction vessel capable of withstanding very high pressures a mixture of acetylene and the vinylidene compound in proportions of from 25 to 65 mole per cent acetylene, a reaction medium such as benzene or water, 0.5% to 5.0% of the weight of the comonomers of an addition polymerization catalyst such as a free radical-generating peroxide or azo compound. The reaction vessel is closed, heated to $40°$ to $150°$ C. with vigorous agitation under a pressure of from 400 to 1000 atmospheres obtained by injecting an inert fluid, e. g., water, into the reaction vessel until the desired reaction pressure is obtained. Other inert fluids besides water can be used to obtain the desired pressure. Specific examples of such other fluids include methyl, ethyl, and t-butyl alcohols, and nitrogen. The polymerization is continued for 5 to 30 hours under these conditions with intermittent injection of water or other inert fluid to maintain the desired pressure, at the end of which the reaction mixture is cooled and the copolymer isolated as described previously.

The process of this invention can be carried out in general at temperatures ranging from $-20°$ to $250°$ C. However, it is preferable to use temperatures of at least 40° C. in order to obtain a practicable rate of polymerization. Likewise, it is preferable to use temperatures below 150° C. in order to reduce the discoloration of the resulting copolymer caused by temperatures above 150° C. Because of the low boiling point of acetylene, the process is carried out under superatmospheric pressure. The autogenous pressure of the reaction mixture at the temperature at which the polymerization is being carried out can be used but higher pressures, e. g., up to 500 lbs./sq. in., can be obtained by introducing a larger excess of acetylene under the desired pressure. Still higher pressures, e. g., up to 1000 atmospheres can be obtained by introducing the inert fluid, e. g., water, into the reaction vessel to give the desired pressure. Pressures of 400 to 1000 atmospheres are preferred since they favor the formation of copolymers containing higher proportions of acetylene.

The vinylidene compounds used in the practice of this invention are the ordinary grades commercially available. These are preferably redistilled just prior to use. The ordinary commercial grade of acetylene is also suitable for use in this process.

The following examples in which parts are by weight are illustrative of the invention.

*Example I*

Into a stainless steel tube capable of withstanding high pressure is charged 100 parts of methyl methacrylate, 40 parts of benzene, 2 parts of di(tertiary-butyl) peroxide, and 25 parts of acetylene. The closed reactor is heated at 135° C. for 8 hours under 900 atmospheres pressure obtained by water injection. At the end of the reaction period, the copolymer is isolated from the reaction mixture as a solid which is then washed with water and dried in a vacuum oven under nitrogen at 50° C. The yield of white solid, which is a copolymer of acetylene and methyl methacrylate, is 94 parts. On analysis this copolymer is found to have the following composition: C, 62.39%, 62.44%; H, 8.15%, 7.96%; iodine No., 13.0, 15.2; inherent viscosity of a solution in chloroform, 0.23. On the basis of the iodine number, this copolymer has an acetylene content of 6.2 mole per cent.

The copolymer of Example I is cast into films from a xylene solution containing 0.1% cobalt naphthenate drier. After drying at room temperature for 15 hours, the resulting films are insoluble in common solvents such as xylene and butanol. After five months' storage in bulk in the presence of air, the copolymer of Example I has an iodine number of only 13.0, this corresponding to only 4.8 mole per cent acetylene and the aged copolymer no longer possesses air-drying properties when applied as a coating composition.

A copolymer of acetylene and methyl methacrylate containing only 2.7 mole per cent acetylene (based on iodine number determination) possesses no drying characteristics either at room temperature or on baking at 110° C. for 15 hours in the presence of cobalt naphthenate drier.

*Example II*

A pressure reactor is charged with a mixture of 65 parts of butyl acrylate, 50 parts of benzene, 5 parts of di(tertiary-butyl) peroxide, 25 parts of acetylene and sufficient nitrogen to provide a pressure of 1,000 lbs./sq. in. The pressure reactor is then heated at 135° C. for 8 hours under 900 atmospheres pressure obtained by the injection of water into the reactor. At the end of this time the reactor is cooled, and the solvent is removed from the product by steam distillation. The resulting copolymer of acetylene and butyl acrylate is separated from water and dried in a vacuum oven under nitrogen at 50° C. The copolymer is a viscous liquid amounting to 52 parts and having the following composition: C, 63.50%, 63.89%, 63.69%; H, 8.10%, 8.16%, 8.06%; iodine No., 16.4, 15.1; inherent viscosity of a 0.1% solution in chloroform, 0.19. The iodine number indicates the presence of 7.5 mole per cent combined acetylene.

A solution of the copolymer of Example II in xylene containing 0.1% cobalt naphthenate drier is rendered solid and insoluble in xylene or butanol by baking in air at 115° C. for 15 hours. The physical characteristics of the liquid copolymer are not changed by 15 hours' exposure at room temperature in the presence of cobalt naphthenate drier.

*Example III*

A pressure reactor is charged with 90 parts of styrene, 50 parts of water, 3 parts of di(tertiary-butyl) peroxide, 5 parts of the sodium salt of a hydrocarbon sulfonate having about 14 carbon atoms, 25 parts of acetylene and sufficient nitrogen to give a pressure of 1,000 lbs./sq. in. This mixture is heated at 135° C. for 8 hours under 900 atmospheres pressure obtained by injection of water. After working up the reaction product as in the preceding examples, there is obtained 35 parts of a white solid styrene/acetylene copolymer containing 8.5 mole per cent combined acetylene (based on iodine number). This copolymer has, on analysis, the following characteristics: C, 89.93%, 90.57%, 90.33%; H, 7.93%, 7.81%, 7.92%; iodine No. 23.5, 20.4; inherent viscosity (0.1% solution in chloroform), 0.02. Solutions of the copolymer of Example III can be applied to various surfaces as a coating composition.

*Example IV*

A pressure reactor is charged with 40 parts of benzene, 106 parts of acrylonitrile, 25 parts of acetylene and 2 parts of 1,1'-azodicyclohexanecarbonitrile. This mixture is heated at 95° C. under 900 atmospheres pressure, obtained by the injection of water, for 8 hours. After working up the reaction mixture in the usual manner, there is obtained 44.5 parts of a yellow powder which is a copolymer of acetylene and acrylonitrile containing 4.9 mole per cent of acetylene based on the following carbon, hydrogen and nitrogen analyses: C, 68.50%, 68.36%; H, 6.1%, 6.06%; N, 24.78%, 24.73%. This copolymer has an inherent viscosity of 0.51 measured in 0.1% solution in dimethylformamide. Solutions of this copolymer are useful as coating compositions.

*Example V*

A pressure reactor is charged with 60 parts of methacrylonitrile, 40 parts of benzene, 25 parts of acetylene, and 2 parts of alpha,alpha'-azodiisobutyronitrile. The reaction mixture is heated at 80° C. for 8 hours under 900 atmospheres pressure obtained by the injection of water into the reaction vessel. There is isolated from the reaction mixture by the usual procedure, 8 parts of a brown powdery copolymer of acetylene and methacrylonitrile. This copolymer contains 5 mole per cent of acetylene based on the iodine number. The copolymer has the following analytical characteristics: C, 70.16%, 70.29%; H, 7.90%, 7.84%; N, 19.08%, 19.01%; iodine No., 23.6, 17.1; inherent viscosity (0.1% solution in dimethylformamide), 0.22. Solutions of this copolymer are also useful as coating compositions.

The examples have illustrated the preparation of copolymers of acetylene with certain vinylidene compounds having the vinylidene $CH_2=C<$, group attached by a single bond to carbon in turn attached by a multiple bond to another atom; however, the process of this invention has generic application in the preparation of copolymers of acetylene and vinylidene compounds, as thus defined. Thus, there may be employed, in addition to the vinylidene compounds of the examples, acrylic and α-alkylacrylic compounds such as ethyl acrylate, cyclohexyl methacrylate, octyl methacrylate, methoxymethyl methacrylate, and chloroethyl acrylate; vinyl ketones, e. g., methyl vinyl ketone; and compounds having a vinylidene group attached to an aromatic ring, e. g., α-methylstyrene.

As indicated above, it is necessary to employ a mixture of vinylidene compound and acetylene containing at least 15 mole per cent of acetylene to obtain a copolymer containing a substantial proportion of acetylene. By using comonomer mixtures containing at least 15 mole per cent of acetylene, products containing from 5 to 50 mole per cent of combined acetylene are obtained. As the ratio of acetylene to vinylidene compound in the monomer mixture is increased the conversions and catalyst efficiencies decrease; hence, for economic reasons, it is preferred to use monomer mixtures containing no more than 65 mole per cent of acetylene. However, higher proportions of acetylene are operable, i. e., the vinylidene compound can be copolymerized in the presence of more than 65 mole per cent of acetylene, e. g., 70–75 mole per cent, if desired.

The catalyst which are generally operable for initiating the copolymerization of the vinylidene compounds with acetylene are the free radical-forming addition polymerization catalysts, i. e., the free radical-liberating organic polymerization catalyst, preferably those having the general formula RXXR', wherein R is a monovalent organic radical, R' is a monovalent organic radical or hydrogen, and X is an element of integral atomic number of 7 to 8, i. e., nitrogen or oxygen. These free radical-liberating peroxide and azo compounds are employed in proportions ranging from 0.01% to 10% of the weight of the comonomers. Of these two types of catalysts the peroxide compounds are more effective in initiating the copolymerization of vinylidene compounds with acetylene than the azo compounds and can therefore be used in smaller amounts than the azo compounds. The preferred proportions of each type of catalyst depend on the particular proportion of acetylene being used in the polymerization. In general, larger proportions of catalyst are required for the polymerization of mixtures containing the larger proportions of acetylene. With dialkyl peroxide catalysts proportions as low as 0.015% of the comonomers are useful when the comonomer mixture contains 25 mole per cent of acetylene, but when mixtures containing 28 or more mole per cent of acetylene are being polymerized, at least 0.5% of peroxide compound is required. The preferred proportions of peroxide catalyst range from 0.5% to 5%. On the other hand, when azo catalysts are being employed, it is necessary to use at least 1% with monomer mixtures containing more than 25 mole per cent of acetylene. The preferred proportions of azo catalysts range from 1% to 5% of the weight of the comonomers.

The examples illustrate the use of one specific peroxide type of free radical-liberating catalyst. However, other specific examples of this type of catalyst which can be used include other dialkyl peroxides such as di(tertiary-amyl)peroxide, tertiary-butyl pentamethylpropyl peroxide; alkyl hydroperoxides such as tertiary-butyl hydroperoxide and 1-hydroxyethyl hydroperoxide-1; and diacyl peroxides such as benzoyl peroxide, acetyl peroxide and acetyl benzoyl peroxide.

The examples also illustrate the use of two azo catalysts in the process of this invention. However, other organic azo compounds wherein the azo, —N=N—, group is acyclic and bonded from both the nitrogens to discrete carbons which are aliphatic in character and at least one of which carbons is tertiary, i. e., attached to three other carbons by single valences, such as described by Hunt in U. S. Patent 2,471,959, can be used. Additional specific examples of other azo type free radical-generating catalysts which can be employed in preparing the copolymers of this invention include: α-(carbamylazo)isobutyronitrile, α-(carbamylazo)isobutyramide, α,α'-azobis(α-cyclohexylpropionitrile), dimethyl 1,1'-azodicyclohexanecarboxylate, and diethyl α,α'-azodiisobutyrate.

The examples have illustrated the use of certain organic solvents as reaction media in the process of this invention, and a polymerization carried out in aqueous emulsion.

The process of this invention can also be carried out in the presence of other solvents or diluents. For example, the reaction medium can be another alcohol, e. g., methyl, ethyl, propyl, isopropyl, or n-butyl alcohol, another hydrocarbon, e. g., octane, isoheptane, benzene, and the like. In emulsion polymerization, it is desirable to include a dispersing agent, e. g., sodium dodecylsulfate, in the reaction mixture. The polymerization can also be carried out in the absence of solvents or diluents.

In view of the presence of a substantial amount of unsaturation in the copolymers of this invention, they are particularly useful as adhesives and as ingredients of various types of coating compositions. The acrylyl and alkacrylyl copolymers are also useful as intermediates for the preparation of unsaturated polyacids.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for obtaining macromolecular copolymers of acetylene, containing 5–50 mole per cent acetylene, with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group wherein a mixture, the polymerizable components of which consist essentially of acetylene and said polymerizable vinylidene compound, the mixture containing 15–75 mole per cent of acetylene, is reacted at —20 to 250° C. under superatmospheric pressure in the presence of a free radical producing polymerization initiative substance.

2. Process for obtaining macromolecular copolymers of acetylene, containing 5-50 mole per cent acetylene, with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group wherein a mixture the polymerizable components of which consist essentially of 15-75 per cent acetylene, with the remainder being said polymerizable vinylidene compound is heated at 40-150° C. for two to thirty hours under a pressure of 100-1000 atmospheres in the presence of a free radical producing polymerization initiative substance, a portion of said pressure being obtained by injecting an inert fluid into the reaction mixture.

3. A macromolecular copolymer of acetylene with a polymerizable vinylidene compound having but one vinylidene group and that attached by a single bond to a carbon multiple bonded to nitrogen, said copolymer containing 5-50 mole per cent combined acetylene, the remainder being, in combination, said vinylidene compound.

4. A macromolecular copolymer of acetylene with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group, said copolymer containing 5-50 mole per cent combined acetylene, the remainder being, in combination, said vinylidene compound.

5. A macromolecular copolymer of acetylene with a methacrylic acid ester, said copolymer containing 5-50 mol per cent combined acetylene, the remainder being, in combination, a methacrylic acid ester.

6. A macromolecular copolymer of acetylene with methyl methacrylate, said copolymer containing 5-50 mol per cent combined acetylene, the remainder being, in combination, methyl methacrylate.

7. A macromolecular copolymer of acetylene with acrylonitrile, said copolymer containing 5-50 mol per cent combined acetylene, the remainder being, in combination, acrylonitrile.

8. A macromolecular copolymer of acetylene with butyl acrylate, said copolymer containing 5-50 mol per cent combined acetylene, the remainder being, in combination, butyl acrylate.

9. A macromolecular copolymer of acetylene with styrene, said copolymer containing 5-50 mol per cent combined acetylene, the remainder being, in combination, styrene.

10. A macromolecular copolymer of acetylene with methacrylonitrile, said copolymer containing 5-50 mol per cent combined acetylene, the remainder being, in combination, methacrylonitrile.

11. Process for obtaining copolymers of acetylene, containing 5-50 mol per cent acetylene, with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group wherein a mixture, the polymerizable components of which consist essentially of acetylene and said polymerizable vinylidene compound, the mixture containing 15-75 mol per cent of acetylene, is reacted at —20 to 250° C. under superatmospheric pressure in the presence of a free radical producing initiative substance of the class consisting of peroxy polymerization catalysts and azo compound polymerization catalysts.

12. Process for obtaining copolymers of acetylene, containing 5-50 mol per cent acetylene, with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group wherein a mixture, the polymerizable components of which consist essentially of acetylene and said polymerizable vinylidene compound, the mixture containing 15-75 mol per cent of acetylene, is reacted at —20 to 250° C. under superatmospheric pressure in the presence of a peroxy polymerization catalyst.

13. Process for obtaining copolymers of acetylene, containing 5-50 mol per cent acetylene, with a polymerizable vinylidene compound having but one vinylidene group and selected from the class consisting of acrylic and alpha-alkacrylic acid esters and nitriles of said acids, vinyl ketones, and vinylidene compounds having an aryl radical attached to one of the free valences of the vinylidene group wherein a mixture, the polymerizable components of which consist essentially of acetylene and said polymerizable vinylidene compound, the mixture containing 15-75 mol per cent of acetylene, is reacted at —20 to 250° C. under superatmospheric pressure in the presence of a free radical producing initiative substance of the class consisting of peroxy polymerization catalysts and azo compound polymerization catalysts, a portion of said pressure being obtained by injecting an inert fluid into the reaction mixture.

FRANK CLIFTON McGREW.
PAUL SWITHIN PINKNEY.

References Cited in the file of this patent

UNITED STATES PATENTS

| Number | Name | Date |
|---|---|---|
| 2,327,705 | Frolich et al. | Aug. 24, 1943 |
| 2,363,910 | Swaney | Nov. 28, 1944 |
| 2,476,936 | Whetstone | July 19, 1949 |
| 2,540,736 | Kalb et al. | Feb. 6, 1951 |
| 2,561,814 | Novotny et al. | July 24, 1951 |

FOREIGN PATENTS

| Number | Country | Date |
|---|---|---|
| 845,661 | France | May 22, 1939 |

OTHER REFERENCES

Krczil: Kurzes Handbuch der Polymerisationstechnik, vol. II, pgs. 7 and 337 (1941).